US009711048B1

(12) United States Patent
Knas et al.

(10) Patent No.: US 9,711,048 B1
(45) Date of Patent: Jul. 18, 2017

(54) WIRELESS TRANSMISSION SYSTEM TO DETERMINE PARKING LOT OCCUPANCY

(71) Applicant: MASSACHUSETTS MUTUAL LIFE INSURANCE COMPANY, Springfield, MA (US)

(72) Inventors: Michal Knas, Monson, MA (US); Jiby John, Suffield, CT (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 0 days.

(21) Appl. No.: 15/372,178

(22) Filed: Dec. 7, 2016

Related U.S. Application Data

(60) Provisional application No. 62/264,634, filed on Dec. 8, 2015.

(51) Int. Cl.
*B60Q 1/48* (2006.01)
*G08G 1/14* (2006.01)

(52) U.S. Cl.
CPC .................................... *G08G 1/141* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,350,724 B2 * | 1/2013 | Szczerba | B60Q 9/005 340/435 |
| 9,123,246 B2 * | 9/2015 | Paul | G08G 1/141 |
| 2010/0253543 A1 * | 10/2010 | Szczerba | B60Q 9/005 340/932.2 |
| 2014/0139359 A1 * | 5/2014 | Paul | G08G 1/141 340/932.2 |
| 2016/0140846 A1 * | 5/2016 | Outwater | G08G 1/144 340/932.2 |
| 2016/0189324 A1 * | 6/2016 | Eramian | G06Q 50/30 705/13 |
| 2016/0379493 A1 * | 12/2016 | Bhuiya | G06Q 10/02 701/117 |

* cited by examiner

*Primary Examiner* — Travis Hunnings
(74) *Attorney, Agent, or Firm* — Eric L. Sophir; Dentons US LLP

(57) ABSTRACT

A wireless transmission system includes a server to receive a unique identifier associated with a parking space from a first receiving device. The server then generate an instruction to query a type of the unique identifier and transmit the instruction to the database. The server in response to determining that a parking space is occupied by the first receiving device, generate an instruction to modify a record within the database associated with the parking space as occupied. The server receive a query from a second receiving device about the availability of parking spaces, and generate an instruction to receive one or more unoccupied parking spaces. The server generates a graphical user interface including a census data where the census data may include the occupied parking spaces, unoccupied parking spaces, and number of occupants within the automobile. The server transmit the graphical user interface to the second receiving device.

20 Claims, 5 Drawing Sheets

WIRELESS TRANSMISSION SYSTEM TO DETERMINE PARKING LOT OCCUPANCY

CROSS-REFERENCE TO RELATED APPLICATION

This application claims priority to U.S. Provisional Patent Application Ser. No. 62/264,634, filed on Dec. 8, 2015, which is hereby incorporated by reference in its entirety.

TECHNICAL FIELD

The subject matter disclosed herein generally relates to wireless transmission systems.

BACKGROUND

Locating a vacant parking space is an ordeal that causes frustration for many commuters. Even if a commuter pays to enter a parking lot, valuable time is wasted searching for a parking space within the parking lot. In many instances parking lots that service hospitals, airports, mass transit stations, entertainment forums, shopping malls, and the like are always the most crowded, when time is the most crucial. As regions become more populated, finding a vacant parking space will become increasingly difficult for commuters.

Conventionally, commuters drive around and look for vacant parking space. Recently, several current devices have attempted to facilitate locating a parking space. In particular, an existing system for locating vacant parking spaces within a garage provides drivers with a map of available parking spaces. However, the conventional and existing methods of parking management are not efficient as the map is manually updated and may be inaccurate. Furthermore, even if the map is accurate, many drivers may not be able to quickly locate the vacant space due to the complex nature and architecture of parking garages.

SUMMARY

For the aforementioned reasons, there is a need for a method and a system to efficiently and accurately identify and navigate drivers to empty parking spaces. The systems and methods disclosed herein attempt to address the above-mentioned shortcomings in the art and provide a variety of other benefits. The systems and methods described herein can create, maintain, and transmit a current parking lot occupancy.

In an embodiment, a wireless transmission system includes a transmitter device configured to transmit a unique identifier associated with one or more parking spaces. The wireless transmission system further includes a receiving device configured to receive the unique identifier associated with the one or more parking spaces from the transmitter device. The wireless transmission system further includes a server in communication with the receiving device. The server is configured to receive the unique identifier and a receiving device identifier from the receiving device. The server is further configured to determine a current location associated with the receiving device based on the unique identifier. The server is further configured to generate an instruction to query a type of the unique identifier, wherein the type of the unique identifier is associated with whether the parking space is occupied by the receiving device. The server is further configured to transmit the instruction to a database associated with the one or more parking spaces. The server is further configured to generate data for rendering on a graphical user interface comprising one or more options configured to receive parking-space preferences in response to determining whether the parking space is occupied by the receiving device. The server is further configured to transmit the data for rendering on the graphical user interface of the receiving device.

In an embodiment, a server-implemented method includes transmitting, by a transmitter device, a unique identifier associated with one or more parking spaces to a receiving device. The server-implemented method further includes receiving, by a server, the unique identifier and a receiving device identifier from the receiving device. The server-implemented method further includes determining, by the server, a current location associated with the receiving device based on the unique identifier. The server-implemented method further includes generating, by the server, an instruction to query a type of the unique identifier, wherein the type of the unique identifier is associated with whether the parking space is occupied by the receiving device. The server-implemented method further includes transmitting, by the server, the instruction to a database associated with the one or more parking spaces. The server-implemented method further includes in response to determining whether the parking space is occupied by the receiving device, generating, by the server, data for rendering on a graphical user interface comprising one or more options configured to receive parking-space preferences. The server-implemented method further includes transmitting, by the server, the data for rendering on the graphical user interface of the receiving device.

In an embodiment, a wireless transmission system includes a database and a server in communication with the database. The server is configured to receive a unique identifier associated with a parking space from a first receiving device, wherein the unique identifier is transmitted by a transmitter device. The server is further configured to generate a first instruction to query a type of the unique identifier, wherein the of the unique identifier is associated with whether the parking space is occupied by the first receiving device. The server is further configured to transmit the first instruction to the database associated with one or more parking spaces. The server is further configured to in response to determining that a parking space is occupied by the first receiving device, generate a second instruction to modify a record within the database associated with the parking space as occupied. The server is further configured to generate a third instruction to query the first receiving device regarding a number of occupants within an automobile associated with the first receiving device. The server is further configured to upon transmitting the third instruction to the first receiving device, receive the number of occupants in the automobile associated with the first receiving device. The server is further configured to receive a query from a second receiving device about the availability of parking spaces. The server is further configured to generate a fourth instruction to receive one or more unoccupied parking spaces. The server is further configured to generate data for rendering on a graphical user interface comprising a census data, wherein the census data comprises at least one of the occupied parking spaces, unoccupied parking spaces, and number of occupants within the automobile. The server is further configured to transmit the data for rendering on the graphical user interface to the second receiving device.

In an embodiment, a method include receiving, by a server, a unique identifier associated with a parking space from a first receiving device, wherein the unique identifier is transmitted by a transmitter device. The method further includes generating, by the server, a first instruction to query a type of the unique identifier, wherein the type of the unique identifier is associated with whether the parking space is occupied by the first receiving device. The method further includes transmitting, by the server, the first instruction to a database associated with one or more parking spaces. The method further includes in response to determining that a parking space is occupied by the first receiving device, generating, by the server, a second instruction to modify a record within the database associated with the parking space as occupied. The method further includes generating, by the server, a third instruction to query the first receiving device regarding a number of occupants within an automobile associated with the first receiving device. The method further includes upon transmitting the third instruction to the first receiving device, receiving by the server, the number of occupants in the automobile associated with the first receiving device. The method further includes receiving, by the server, a query from a second receiving device about the availability of parking spaces. The method further includes generating, by the server, a fourth instruction to receive one or more unoccupied parking spaces. The method further includes generating, by the server, data for rendering on a graphical user interface comprising a census data, wherein the census data comprises at least one of the occupied parking spaces, unoccupied parking spaces, and number of occupants within the automobile. The method further includes transmitting, by the server, the data for rendering on the graphical user interface to the second receiving device.

In an embodiment, a wireless transmission system includes a transmitter device configured to transmit a unique identifier associated with one or more parking spaces. The wireless transmission system further includes a database storing data corresponding to a parking lot occupancy and parking-space attributes. The wireless transmission system further includes one or more receiving devices in communication with the database. The wireless transmission system further includes a server in communication with the one or more receiving devices and the database. The server is configured to generate a first graphical user interface comprising one or more inputs fields configured to query a user associated with a receiving device regarding a parking-space preference, wherein the parking-space preference is associated with one or more parking space attributes. The server is further configured to upon transmitting the first graphical user interface, receive the parking-space preference. The server is further configured to receive the unique identifier and a receiving device identifier from the receiving device. The server is further configured to determine a current location associated with the receiving device based on the received unique identifier. The server is further configured to generate an instruction to receive attributes associated with one or more parking spaces corresponding to the parking-space preferences. The server is further configured to upon transmitting the instructions to the database, receive one or more parking spaces corresponding to the parking-space preferences. The server is further configured to generate a second graphical user interface configured to display instructions to reach one or more parking spaces corresponding to the parking-space preferences in relation to the current location of the receiving device. The server is further configured to transmit the second graphical user interface to the receiving device.

In an embodiment, a server-implemented method includes transmitting, by a transmitter device, a unique identifier associated with one or more parking spaces. The server-implemented method further includes generating, by a server, a first graphical user interface comprising one or more inputs fields configured to query a user associated with a receiving device regarding a parking-space preference, wherein the parking-space preference is associated with one or more parking space attributes. The server-implemented method further includes upon transmitting the first graphical user interface, receiving, by the server, the parking-space preference. The server-implemented method further includes receiving, by the server, the unique identifier and a receiving device identifier from the receiving device. The server-implemented method further includes determining, by the server, a current location associated with the receiving device based on the received unique identifier. The server-implemented method further includes generating, by the server, an instruction to receive attributes associated with one or more parking spaces corresponding to the parking-space preferences. The server-implemented method further includes upon transmitting the instructions to the database, receiving, by the server, one or more parking spaces corresponding to the parking-space preferences. The server-implemented method further includes generating, by the server, a second graphical user interface configured to display instructions to reach one or more parking spaces corresponding to the parking-space preferences in relation to the current location of the receiving device. The server-implemented method further includes transmitting, by the server, the second graphical user interface to the receiving device.

In some embodiments, one or more beacons are integrated with a vehicle to transmit one or more respective identifiers. The identifiers can be static or programmable, and can be associated with the vehicle. The identifiers can be stored in a database to be associated with the vehicle, such that when a system receives the identifier, it can associate it with the vehicle. Each of the identifiers can be associated with the vehicle, but can also be associated with range information. For example, a first identifier can be associated with a 100 m range and a second identifier can be associated with a 3 m range. In this way, the system can understand whether the vehicle is within 100 m or within 3 m. Alternatively or in addition to using beacons having differing Broadcasting Power, embodiments can use the RSSI to approximate distance between the beacon and the receiving device.

In some embodiments, a beacon is integrated within a portable device, either with a smart phone or separate device, such as a key chain, that a user keeps. The identifiers are not integrated with an automobile, but are instead portable.

In some embodiments, beacons at fixed locations, and the user receives advertising data packets from the beacons, and the advertising data packets have different distance granularities associated with them. For instance, large malls can have several parking lots with human-understandable identifiers, such as colors. These parking lots could also have computer-understandable advertising data packets so that a computer, such as a smartphone, could interpret the advertising data packets and remember where the car is parked.

In some embodiments, alternative methods for identifying whether a car is in a parking spot are provided. Bluetooth and beacon technology is currently not used by everyone, and perhaps never will be; therefore, embodiments contemplated using alternative methods for determining whether parking spaces are open. These methods can include automated video surveillance of parking spaces, in which a computer algorithm can determine whether a parking space is occupied. This can be accomplished by, for example, placing a camera to view several parking spaces, e.g., 20 parking spaces, and analyzing whether each particular space is empty. The system can compare a stored image of an empty space to the respective space's current state. If there is a car in the space, the system can identify it and mark it as occupied. The system may need to be calibrated for weather, such as snow, and lighting. Other embodiments include using pressure sensors to determine whether a space is occupied. In this way, the system can assess the current parking lot occupancy.

In some embodiments, a receiving device (e.g., a smartphone) can also transmit an advertising data packet, acting as a beacon, which can be received by another receiving device, fixed or mobile. In either case, fixed or mobile, this reception serves to notify the receiver that the mobile transmitter is nearby. As an example, a mobile application could instruct a mobile device to transmit an advertising data packet associated with a social network identity, which upon reception at another device, fixed or mobile, could indicate the proximity of a social network user. In another example, a fixed device (e.g., a front door) could receive an advertising data packet transmitted from a mobile device alerting the door that the device is approaching and unlock the door. Many other use cases are possible.

In some embodiments, in addition to using RSSI, certain embodiments can use triangulation to assess more accurately the location of a receiving device. For instance, the receiving device may receive signals from more than once source or of more than one type, e.g., Wi-Fi, BLE, and GPS. By relying on more than once source, these embodiments are more reliable and more accurate.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

DETAILED DESCRIPTION

Reference will now be made in detail to the preferred embodiments, examples of which are illustrated in the accompanying drawings. The embodiments described herein are intended to be exemplary. One skilled in the art recognizes that numerous alternative components and embodiments may be substituted for the particular examples described herein and still fall within the scope of the invention.

Figure 1:
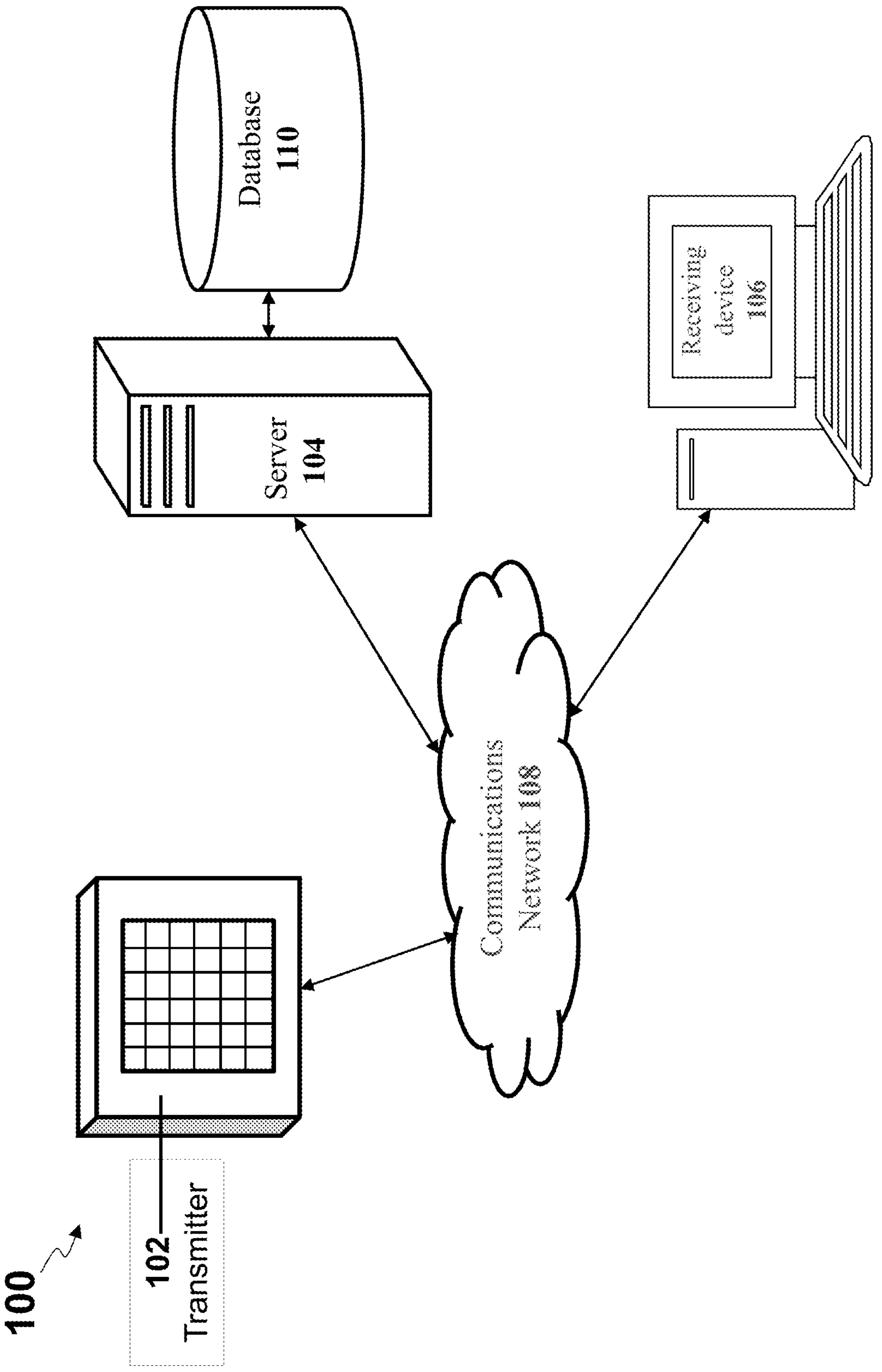
FIG. 1 illustrates a wireless transmission system, according to an exemplary embodiment.

FIG. 1 is an illustration of an illustrative wireless transmission system 100, according to an exemplary embodiment. The wireless transmission system 100 includes a transmitter 102, a server 104, a receiving device 106, a communication network 108, and a database 110. The transmitter 102, the server 104, and the receiving device 106 are in communication to each other via the communication network 108.

The transmitter or a transmitting device 102 of the wireless transmission system 100 may be any computing or other electronic device comprising a processor and a wireless interface capable of transmitting signals to the receiving device 106. The signals may contain binary data, and the binary data may represent various types of data and/or information for the receiving device 106 to consume and implement the data. The wireless interface of the receiving device 106 receiving the signals, may translate the signals into useful binary data triggering various tasks and process according to the application executed by the receiving device 106. The transmitter 102 may implement any suitable components for wirelessly communicating with the receiving device 106, or other transmitters of the wireless transmission system 100. The technological components of the wireless transmission system 100 may include wireless networking hardware and the related protocols, such as a Bluetooth low energy (BLE) interface chip and the Bluetooth wireless communication protocols.

The server 104 of the wireless transmission system 100 may be any computing device comprising non-transitory machine-readable storage media, processors, and software modules capable of performing various tasks and processes described herein. In an embodiment, an application can be downloaded to the receiving device 106 that is able to communicate with the server 104. The application can be created and maintained by same party whom maintains the parking lot. The server 104 may be communicatively coupled over the communication network 108 to one or more software modules and devices, including the transmitter 102 and the receiving device 106. In certain embodiments, component features of the server 104 may reside on separate physical devices.

The database 110 may be a database containing information regarding the transmitter 102, their locations, advertising content, or any information for a user. The database 110 in some embodiments can include one or more content sources. The database 110 can be part of the server 104, however, in some embodiments the database 110 may reside on a different computing device than the server 104 (i.e., a distributed computing environment).

The communication network 108 which is any common communication architecture facilitates communication between various computing devices. For example, the computing devices communicating over the network would be the one or more receiving devices, one or more transmitters, a network server, and one or more databases. One having ordinary skill in the art would appreciate that the communication network 108 may be the Internet, a private intranet, or some hybrid of the two. The communication network 108 may be comprised of any combination of devices and protocols capable of facilitating communication between computing devices. Non-limiting examples of devices comprising the communication network 108 may include routers, switches, hubs, firewalls, proxy servers, telecommunications trunks, and the like. Non-limiting examples of protocols employed by the communication network 108 may include TCP/IP, Wi-Fi, Bluetooth®, 3G, Wi-Max, and the like. Wireless communication between one or more user receiving devices and one or more transmitters may be performed with a relatively short-range wireless communication protocol such as Wi-Fi, Bluetooth, high frequency systems, or other relatively localized wireless communication protocols.

The receiving device 106 may be, for example, any mobile computing device with one or more web browsers or other specific applications. Other non-limiting examples of the receiving device 106 include tablets, smartphones, and other electronic computing devices. It should be appreciated that the software modules described herein may be distributed among the devices of the system in varying permutations.

Figure 2A:
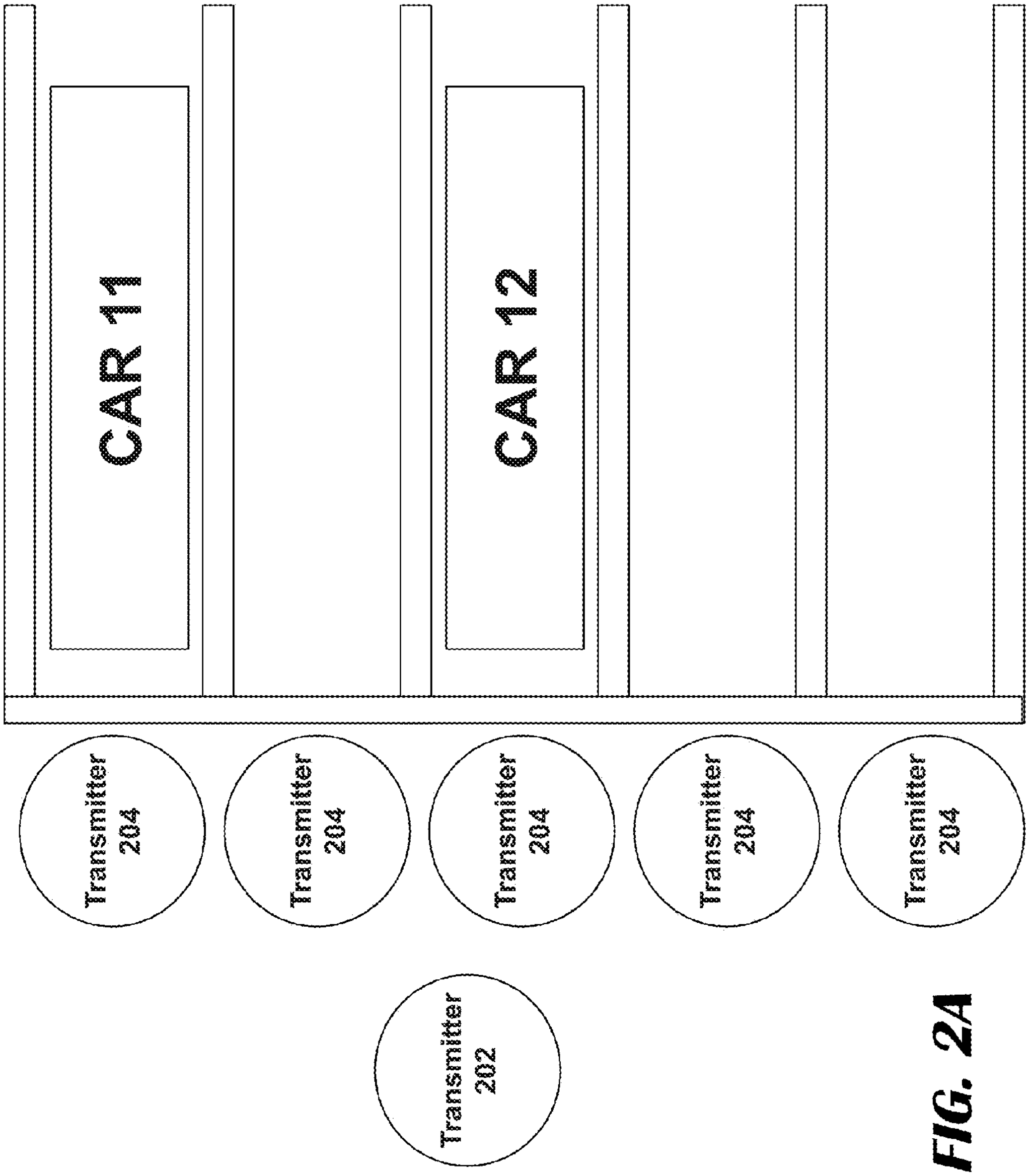
FIG. 2A illustrates arrangement of transmitters of a wireless transmission system in a parking lot, according to an exemplary embodiment.
Figure 2B:
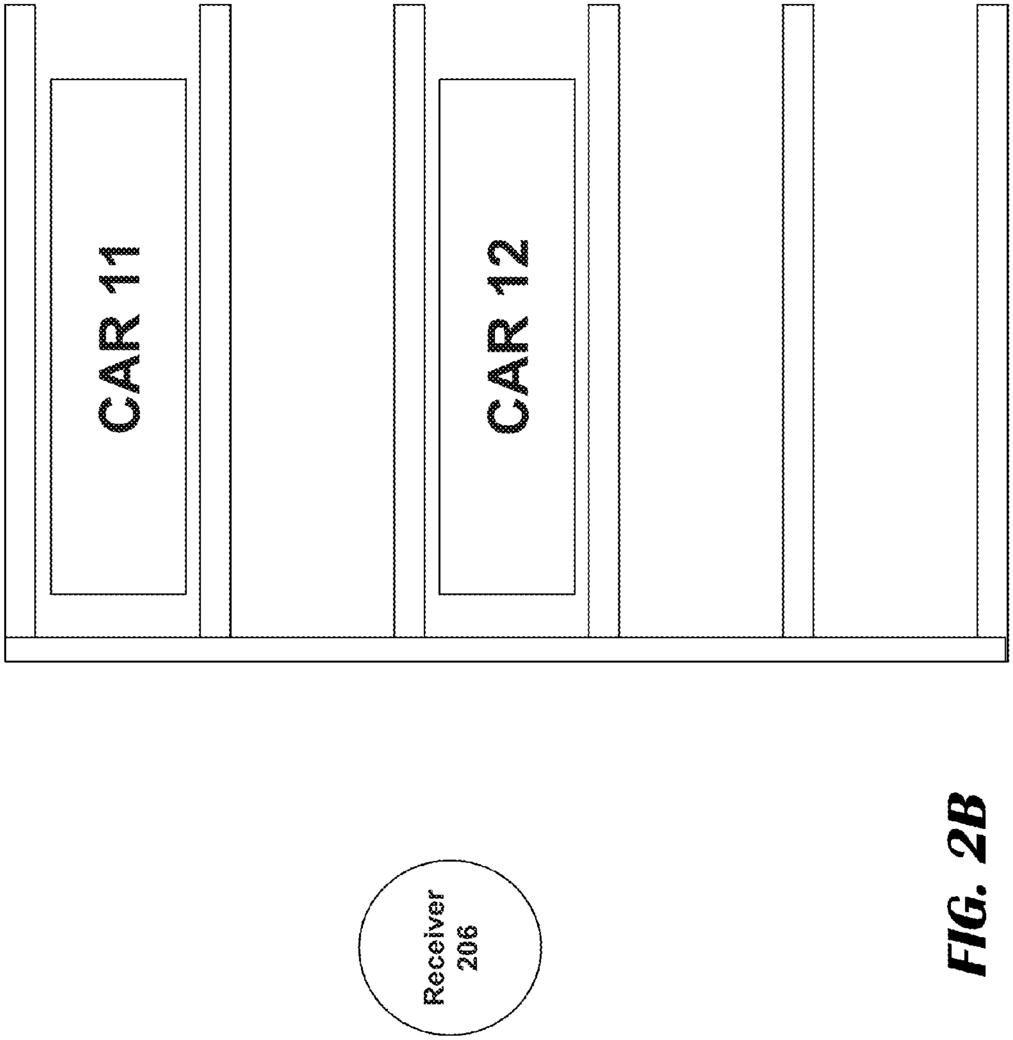
FIG. 2B illustrates arrangement of receivers of a wireless transmission system for beacons in a parking lot, according to an exemplary embodiment.

FIGS. 2A and 2B illustrate arrangement of transmitters and receivers of a wireless transmission system in a parking lot, according to an exemplary embodiment. In these embodiments, there are two wireless transmitter types (transmitter 202 and transmitter 204) with different ranges arranged in the parking lot. The transmitters 202 and 204 can be Bluetooth® beacons or other wireless transmitters, such as WiFi (IEEE 802.11) or Near-Field Communication (NFC). In this embodiment, the transmitter 202 can have a wider range, e.g., 100 meters, whereas the transmitters 204 can have shorter ranges, e.g., 3 meters. The transmitters 202 can be placed up high (e.g., at a higher elevation) to enable relatively unobstructed views, while the transmitters 204 can be placed nearer to the ground (e.g., lower elevation), as they are generally meant to be received at short ranges. These ranges can be set by, for example, changing the Broadcasting Power setting in the transmitter 202 and the transmitter 204.

The transmitter 202 can transmit one or more unique identifiers associated with several parking spots or an entire parking lot, such as a "green" parking lot of a shopping mall. FIGS. 2A and 2B illustrate five parking spots, two of which are occupied by cars 11 and 12. The drivers of cars 11 and 12 can own a receiving device 206, e.g., a smartphone that can receive signals, including unique identifiers, from transmitters 202 and 204. Each receiving device 206 can include a wireless receiver coupled to one or more computing devices for analyzing the signals from the transmitters 202 and 204. Such computing devices can include applications (apps) for processing the received signals. By processing the received signals, the receiving device 206 can identify its location either by the exact parking spot or within a reasonable distance, e.g., within 10 meters, from the parking spot.

In some embodiments, the receiving device 206 can be any mobile computing device that can receive a wireless signal from the illustrative transmitters 202 and 204. Alternative embodiments include other devices capable of receiving and processing the signals received from the illustrative transmitters 202 and 204. These devices can include other computing devices, including cars, tablets, or laptops. When the receiving device 206 receives the unique identifier, it can process it using one or more apps in collaboration with a server.

If a server of the wireless transmission system is not granular enough to identify the exact parking space each car is in, the wireless transmission system can still work. For example, in some embodiments the server of the wireless transmission system can count the number of cars in the parking lot and infer from that how many spaces are available in the lot, and determine the location of the spaces. For example, if a parking lot has spaces in a 10×10 grid, and the server of the wireless transmission system counts 10 cars in each row except for one, the server of the wireless transmission system can assume that there are no spaces except for in the one row without 10 cars. A person skilled in the relevant art will appreciate that the beacon transmitter will inevitably communicate with a receiving device within each car and transmit this information to the server. The server, may then determine a status for the occupancy of the car based on the received data. For example, if a beacon does not communicate with a receiving device for a parking space, the server will determine that said space is empty.

Alternatively or in addition to having the one transmitter 202 with a wider range, one of the transmitters 204 can have wide range, but also use the RSSI to assess proximity. This can have disadvantages as these transmitters are typically placed nearer to the ground and thus may be obstructed, which can affect range. Therefore, depending on the configuration of a parking lot, design considerations and testing may be necessary to assess the optimal wireless transmission system configuration of a given parking lot.

Although FIG. 2A shows only a limited number of the transmitters 202 and 204, it should be appreciated that more transmitters may be communicatively coupled to one another, over a wired and/or wireless network of transmitters. That is, locations, such as brick-and-mortar retail stores, theatres, parks, office buildings, schools, campuses of multiple buildings, governmental or administrative buildings, and the like, may implement localized networks of transmitters 202 and 204 to transmit and/or collect data, across a broader area. Furthermore, although the exemplary system described in FIG. 2A describes a stationary transmitters 202 and 204, it should also be appreciated that transmitters 202 and 204 may be any suitable stationary or mobile devices that are capable of performing the various tasks and processes described herein. Thus, a collection of transmitters 202 and 204 can comprise a combination of mobile and stationary devices. It should also be appreciated that, although FIG. 2A describes the transmitters 202 and 204 performing one-way signal transmissions, the transmitters 202 and 204 may be capable of two-way communications (i.e., collecting data from signals transmitted by receiving devices 206), and may be capable of a number of functions or execute a variety of software modules. Non-limiting examples of the transmitters 202 and 204 may include an iBeacon, a wireless router, a cellular phone, a tablet, a workstation, or any other suitable computing or other electronic device.

Figure 3:
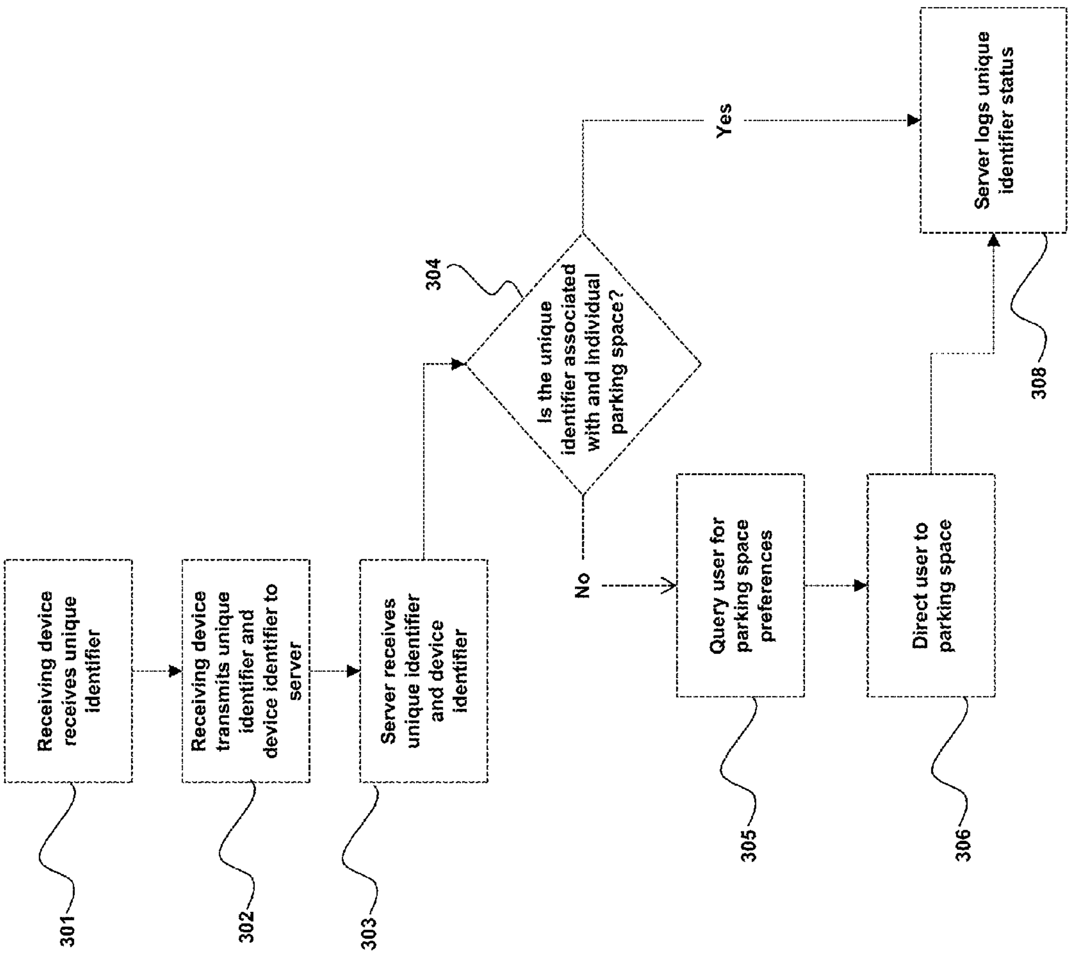
FIG. 3 illustrates a method that tracks parking lot occupancy and delivers associated information to a user in a wireless transmission system, according to an exemplary embodiment.

FIG. 3 illustrates a method that tracks parking lot occupancy and delivers associated information to a user in a wireless transmission system, according to an exemplary embodiment. At step 301, a receiving device receives a UUID in a parking lot from a transmitter. The receiving device can then transmit the unique identifier to a server for processing the unique identifier and a device identifier (e.g., SIM or IMEI numbers) (step 302). The server then receives the identifiers (step 303). In the embodiment of FIG. 3, the receiving device receives data associated with the UUID from the server, such information can include how many spaces are available in that parking lot, which stores are nearby that parking lot, information identifying the closest entrance or parking-space-identifying information. Depending on the type of unique identifier, the user may receive different information. For instance, if the UUID is associated with a particular parking space, the user may not receive information about how many other spaces are available in the lot because the user would have already parked. In an alternative embodiment, all of this information could be stored in a local application and need not be received from the server. These alternative embodiments would either cause additional mobile data usage if the information is stored on the internet, or the data would occupy local storage on the receiving device. Finally, the receiving device (or the server) can store the unique identifier for later retrieval when attempting to find the car. A person skilled in the relevant art will appreciate that the server (as explained in FIG. 1) may also receive the data from the receiving device, generate instructions to query a database based on the received data, and generate and display a graphical user interface containing the information. For example in step 303, the server may receive the identifiers from the receiving device and determine which parking spaces are associated with the identifiers by querying a database associated with the parking lot. The server may also query the database in order to determine which attractions (e.g., stores) are closest to the identified parking space.

In some embodiments, the UUIDs or unique identifiers of the transmitters must be programmed and associated with particular locations where they are installed. The transmitters continuously broadcast information, for example in the form of data strings, at a pre-determined interval, like a heartbeat of data broadcasts, which are then captured by one or more applications on the customer's smartphone. The data fields in these broadcasted data strings could include an identifier of an individual beacon, location of the beacon in the store, time of day, and any information designed for consumption by the receiving device.

In some embodiments, UUIDs may be random or pseudo-random data strings associated with a device (e.g., receiving device) or device component (e.g., Bluetooth interface, wireless network interface). A UUID may be as complex as a number represented by 128-bits, and have a structure and construction determined by the protocol utilizing the UUID (e.g., 802.11, Bluetooth, NFC), and in some cases, the variant or version of the protocol. It should be appreciated that any suitable implementation and version of UUIDs may be employed to identify devices in the system. Non-limiting examples of techniques for generating a device's UUID may include: a time-based version with unique or random host identifier, a DCE Security version (with POSIX UIDs), a name-based version using an MD5 hash, a random or pseudo-random UUID version, and a name-based version using a SHA-1 hash. For example, in certain embodiments, the UUID comprises the MAC address of the computer that is generating the UUID, and a time stamp associated with the moment the UUID is generated, which could be the number of 100-nanosecond intervals that have passed since midnight.

In the embodiment of FIG. 3, the server can further determine whether the UUID is associated with an individual parking space (step 304). If the UUID is associated with more than one parking space, e.g., not associated with a particular parking space, then the server could cause the local application to query the user, via voice or text, for information about the user's parking-space preferences because it is assumed that user has not picked a parking space yet (step 305). In an alternate embodiment, the server may generate a first graphical user interface comprising one or more inputs fields configured to query the user associated with the receiving device regarding a parking-space preference. The queries can be used to identify a parking-space preferences by obtaining preferred parking-space attributes. Each parking space can have parking-space attributes associated with it, such as how far the parking space is from a particular merchant, whether it is near lighting or security, how far it is from exits or roads, and the type of parking space (e.g., compact, large, handicap). In some embodiments, the server may generate and transmit a graphical user interface to the receiving device and then receive user's parking preferences.

In addition to how far the parking space is from certain locations, the attribute could be binary to signify whether the parking space is close to a parking space, e.g., '1' signifies close and '0' signifies not close. These attributes can be stored in a server or a database. The database can be integrated with or discrete from the server. The user can have a receiving device containing an application, and the application can be in communication with one or both of the server and the database. The application can further communicate directly with the database or communicate with the database through the server. Queries could include merchants the user intends to visit, whether the user wants to park near a light or security, near certain roads or exits, whether the user prefers a compact, handicap or large parking space, whether the user wants to have open spaces adjacent to them, etc.

Upon transmitting the first graphical user interface to the user having the queries, the server receives the parking's-space preferences from the receiving device. The server may also receive a receiving device identifier from the receiving device, and then determines a current location associated with the receiving device based on the received unique identifier. The server may generate an instruction to receive attributes associated with one or more parking spaces corresponding to the parking-space preferences. Upon transmitting the instructions to the database, the server may receive one or more parking spaces corresponding to the parking-space preferences. The server may choose a parking space and command the user's local application to direct the user to that parking space, the parking space associated with one or more transmitters (step 306). In an alternate embodiment, the server may generate a second graphical user interface configured to display instructions to reach one or more parking spaces corresponding to the parking-space preferences in relation to the current location of the receiving device. The server then transmits the second graphical user interface to the receiving device.

Finally, the server logs the unique identifier received from the user to track where the user went and which parking space contains their car by generating an instruction to store the unique identifier and the device identifiers within the database (step 308).

Some embodiments allow for inter-app communication. For instance, when a user enters a parking lot and receives a first UUID from a beacon, an application may suggest a parking location for the user. The user may have certain criteria, such as parking space closest to the entrance the user wants to enter, parking space closest to any entrance, or parking space near a light. An app on the receiving device can query the user for this information, of the information could have been entered previously and stored for later use. Based on this information this embodiment can identify a parking space for the user and communicate its location to a navigation application (e.g., iOS® Maps or Google® Maps). The application may also query the user for which stores they want to visit, and automatically open applications associated with those stores, such that they will run and listen for beacons associated with those stores. In other embodiments, those applications can notify agents at those stores that the user has arrived and possibly arrange for special treatment for the user, such as sales, usual meal requests, or a special greeting.

Figure 4:
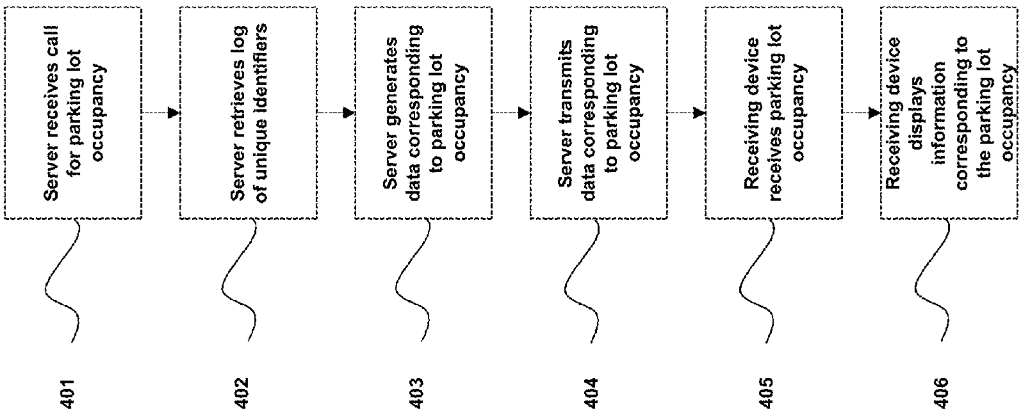
FIG. 4 illustrates a method for a server that can return parking lot occupancy status to a receiving device of a wireless transmission system, according to an exemplary embodiment.

FIG. 4 illustrates a method for a server that can return parking lot occupancy status to a receiving device of a wireless transmission system, according to an exemplary embodiment. In an embodiment, the server may receive a unique identifier associated with a parking space from a first receiving device where the unique identifier is transmitted by a transmitter device. The server may then generate a first instruction to query a type of the unique identifier. The type of the unique identifier may be associated with whether the parking space is occupied by the first receiving device. The server may transmit the first instruction to a database associated with one or more parking spaces. In response to determining that a parking space is occupied by the first receiving device, the server may generate a second instruction to modify a record within the database associated with the parking space as occupied. The server may also generate a third instruction to query the first receiving device regarding a number of occupants within an automobile associated with the first receiving device. Upon transmitting the third instruction to the first receiving device, the server may receive the number of occupants in the automobile associated with the first receiving device.

In this embodiment, a user calls the server to determine the current parking lot occupancy (step 401). Alternatively, the server may receive a query from a second receiving device about the availability of parking spaces. After receiving the call or the query from the user, the server can then retrieve a log of the current parking lot occupancy by generating a fourth instruction to receive one or more unoccupied parking spaces (step 402).

The server can then generate a graphical user interface comprising data corresponding to current parking lot occupancy (step 403). Such data can include a map of which spaces are empty, the number of spaces in a particular lot, the number of occupied or unoccupied spaces, directions to a parking space, etc. The server can then transmit the graphical user interface comprising the data corresponding to current parking lot occupancy to the receiving device (step 404). The receiving device then receives the data corresponding to the current parking lot occupancy (step 405), and displays information corresponding to the data (step 406).

Displaying information corresponding to parking lot occupancy data can take many forms. For example, parking lot managers can use the information as a proxy for the census of the number of people on site, and take appropriate action, such as increasing or decreasing the number of employees maintaining a property. They can also use the information to estimate the number of visitors at different times of the year and use that information for future planning. Parking lot managers can estimate census numbers by assuming that each vehicle includes one or more predefined average numbers of occupants, such as 2.

In the alternative, an application can query users as to how many occupants a car has to obtain more accurate information. That information can further be used to estimate the number of occupants in other cars. This information can be tied to certain parking lots. For instance, parking spaces near a restaurant or movie theater can typically have more occupants because going to these locations is more typically a social activity among multiple people. Similarly, a parking space near retails stores are more frequently visited by single visitors. Therefore, the location of the parking space may affect the predefined number of occupants in a car, and different parking spaces can have different predefined numbers of occupants. In addition, displaying information corresponding to parking lot occupancy data can include displaying the number of parking spaces available in a parking lot, such that people entering the parking lot can know the actual or estimated number of unoccupied parking spaces.

Displaying information corresponding to parking lot occupancy can also include information for visitors to a property. Such information can include directions to a parking space upon arrival or departure. Such directions can be in the form of GPS coordinates or the location of a transmitter, and include directions relative to landmarks, such as light-post signs and stores. The directions can be provided in an integrated application or an alternative application that is more dedicated to navigation.

Embodiments of the wireless transmission system also track when users vacate parking spaces. In the simplest case, the server of the wireless transmission system can identify when a user leaves a building, either receiving a notice that a user has passed an exit/entrance beacon, or the system may receive a beacon signal from the user at an exit. In either case, the server of the wireless transmission system will assume that the user has left the building and is returning to their car. The server of the wireless transmission system can then assume that the parking space will be vacated within a predetermined period of time, e.g., 15 minutes. Alternatively, or in combination, the server of the wireless transmission system could wait for the user's receiving device to transmit the same UUID of the parking space of which they occupied, then the server of the wireless transmission system could similarly wait a shorter period of time, e.g., 5 minutes, to list that parking space as vacated. The server of the wireless transmission system could also use the video monitoring system to verify whether the parking space is vacated. In this way, the server of the wireless transmission system can update the log of current parking lot occupancy.

In some embodiments, to build a robust wireless transmission system, the wireless transmission system should handle some boundary cases. For instance, a user's receiving device may cease working or be otherwise disabled. The user may give its car to another driver who does not have a receiving device, or the car may be towed. In any of these cases, the algorithms described above of the wireless transmission system might not work. Therefore, there should be redundant methods to verify the current parking lot occupancy. The described video monitoring is one such redundant method. Other redundant systems include pressure pads at each parking space to sense whether the space is occupied. Another embodiment includes manually inspecting whether a parking space is occupied or doing so automatically via a camera attached to a vehicle. Such a vehicle could patrol a parking lot offering services, such as jump-starts, to parkers, while at the same time continuously monitoring whether parking spaces are occupied via a video camera. The embodiments described above can be used in conjunction with one or more of these redundant methods, or other such methods, for providing a robust system that determines whether parking spaces are occupied.

In some embodiments of the invention, data strings from the beacon can consist of two other identifiers—a major field and a minor field. The major field is a short data string used to distinguish a smaller subset of beacons within the larger group. The minor field is a shorter data string that may be used to distinguish an even narrower subset within that smaller subset of beacons. For example, the minor field can be used to identify individual beacons. Alternatively, the major and minor fields can together be viewed as comprising a single flat (non-hierarchical) space wherein individual beacons can be identified. In certain embodiments of the invention, the beacon can consist of information regarding transmission power, which is used to determine proximity (distance) from the beacon. The data strings from the beacon can comprise both constant identifiers that do not change with every broadcast and dynamic identifiers that change with every broadcast.

In some embodiments, the beacon transmits repeated broadcasts of data strings. The timing of the broadcasts and the construction of the data strings can vary arbitrarily. The iBeacon device may broadcast the same data string repeatedly, i.e., continuous broadcasting of the data string with the actual identifiers of the beacon. In certain embodiments, the beacon is modified such that the broadcasting of the data string with the actual identifiers is interspersed by broadcasting of data strings that contain varying identifiers. The timing of the broadcasts and the construction of the identifiers in the data strings can be according to a predetermined pattern. The timing of the broadcasts and the construction of the identifiers in the data strings can therefore be retrieved from a database or computed on demand as needed. The timing of the broadcasts and the construction of the identifiers in the data strings can be devised in any combination of the foregoing. In certain embodiments, the data string with the actual identifiers has a specific combination of characters. For example, the data string with the actual identifiers has a specific combination of UUID, a major field, and a minor field. The beacon transmits this data string with the actual identifiers along with subsequent transmissions of data strings where the UUID is constant but the major field or the minor field or both fields change. The periodicity of transmission of the data string with the actual identifiers during the broadcast of the data strings that contain varying identifiers from the beacon can vary arbitrarily. The periodicity of transmission of the data string with the actual identifiers during the broadcast of the data strings that contain varying identifiers from the beacon can be according to a predetermined pattern.

Embodiments of the present disclosure can further include a cloud-based wireless registry and database system, and at least two other devices—a beacon which transmits one or more data strings and a receiving device that receives the transmitted information from the beacon. The beacon transmits the data strings in a certain characteristic pattern. In certain embodiments, the beacon transmits a data string, which is associated with a key that is shared with the cloud infrastructure. The keys can be shared over a secure channel before the transmission of the beacon. The key can be used to manage data integrity and authentication of message. In certain embodiments, the key can determine the periodicity of transmission of the data string with the actual identifiers during the broadcast of the data strings that contain varying identifiers from the beacon.

In some embodiments, this pre-shared key is known by both the wireless registry and the beacon. The beacon broadcasts at least one data string with the actual identifiers and one data string with varying identifiers. In certain embodiments, the data strings with varying identifiers include changing the major field or the minor field or both fields over time. The data strings with changing major field or minor field or both over time can be the result of pseudo random sequence generators. Certain embodiments include data strings with varying identifiers constructed using cryptographic hash functions that take data input and generate a hash function. The hashing functions can be constructed using a variety of algorithms, for example a keyed-hash message authentication code (HMAC), either MD5, SHA1 or SHA256 or such. Certain embodiments utilize a pre-shared key combined with a time component. The time component can be a synchronized function, wherein a known output is provided at a given point in time. This synchronized time function is known to both the beacon and the cloud-based database system.

In some embodiments, the beacon can broadcast data strings that include changing minor fields, and this can be part of the authentication process. In certain instances of beacon authentication, the beacon transmits a data string with the actual identifiers every other time or every first, third, fifth, and every odd transmission. For example, during every even instance of transmission of data strings, the beacon transmits a data string with the actual identifiers. In the next odd instance of the transmission, the beacon transmits a data string with varying identifiers, such as a data string containing a static UUID and major field identifiers, along with a dynamic identifier—the minor field that changes with time. The dynamic identifiers can change in a pseudo random manner that is a function of time and the pre-shared key. In the next even instance of the transmission, the beacon transmits a data string with the actual identifiers, and then in the next transmission, the beacon will contain the original UUID and the major field but now with a different minor field. And thus this beacon will be associated with a characteristic pattern of transmitted data strings.

In some embodiments, the beacon can broadcast data strings that include changing major and minor fields, and these fields can be part of the authentication process. For example, during every fifth instance of transmission of data strings, the beacon transmits a data string with the actual identifiers. In the other four instances of the transmission, the beacon transmits a data string with varying identifiers, such as a data string containing a static UUID identifiers, along with along with the dynamic identifiers—the major field or the minor field or possibly both—that change with time. And thus this beacon will have a different characteristic pattern based on at least the frequency of appearance of the data string with the actual identifiers, and the changes in the dynamic identifiers of the other data strings.

Some embodiments of the present disclosure include a receiving device that receives the beacon broadcasts from the beacon and recognizes the pattern of beacon broadcasts, including the static and dynamic identifiers. And once this receiving device has collected a sufficient history of the beacon broadcasts, the information is sent to the cloud-based wireless registry and database system. Based on the pre-shared key associated with the static identifier, the database system determines the expected pattern of beacon broadcasts for the dynamic identifiers. The database system then compares the received broadcasts from the receiving device to those which itself determined. The degree of that verification, whether the beacon message is appropriately suited for the beacon or not, is sent back to the receiving device. Certain embodiments may require that the receiving device have access to a particular application to interact with the cloud-based wireless registry and database system.

In some embodiments, the transmitters transmit the data strings in their characteristic pattern. A nearby receiving device receives these data strings and once a sufficient number of data strings have been collected, the receiving device communicates with the network server regarding the data strings. When the network server receives the information from the receiving device, the server processes the information to verify the authenticity of the information received by the receiving device or the integrity of the information received by the receiving device or both. Once verified, the receiving device receives knowledge of said verification. If the verification process fails, the network server can be designed to notify an administrator that flags the beacon or the transmission for the beacon. In certain embodiments, other security processes can be initiated to deal with the failure in the verification of the information.

In one an embodiment a network server can receive information from a receiving device containing a collection of data strings received from the beacon. The server can connect to the one or more receiving devices through a public network such as the Internet, a local area network, a wide area network, a private network, telephone network, cable network, broadband network, Ethernet network, digital subscriber line (DSL) network, or any other network that enables servers and receiving devices to interact with one another. The server can include one or more processors, wireless receivers, displays, and one or more memory mediums.

Embodiments of the invention present several advantages over existing systems. The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," and "etc.," are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. The invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein. While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:

receiving, by a server, a unique identifier associated with a parking space from a first receiving device, wherein the unique identifier is transmitted by a transmitter device;

generating, by the server, a first instruction to query a type of the unique identifier, wherein the type of the unique identifier is associated with whether the parking space is occupied by the first receiving device;

transmitting, by the server, the first instruction to a database associated with one or more parking spaces;

in response to determining that a parking space is occupied by the first receiving device, generating, by the server, a second instruction to modify a record within the database associated with the parking space as occupied;

generating, by the server, a third instruction to query the first receiving device regarding a number of occupants within an automobile associated with the first receiving device;

upon transmitting the third instruction to the first receiving device, receiving by the server, the number of occupants in the automobile associated with the first receiving device;

receiving, by the server, a query from a second receiving device about the availability of parking spaces;

generating, by the server, a fourth instruction to receive one or more unoccupied parking spaces;

generating, by the server, data for rendering on a graphical user interface comprising a census data, wherein the census data comprises at least one of the occupied parking spaces, unoccupied parking spaces, and number of occupants within the automobile; and transmitting, by the server, the data for rendering on the graphical user interface to the second receiving device.

2. The method of claim 1, further comprising transmitting by the transmitter device, the unique identifier associated with the parking space to the first receiving device.

3. The method of claim 1, further comprising storing, by the server, the census data is in the database.

4. The method of claim 1, wherein each receiving device comprises a wireless receiver, and wherein the wireless receiver is either coupled to each receiving device or the wireless receiver is an integrated part of each receiving device.

5. The method of claim 1, wherein the query from the second receiving device about the availability of the parking spaces comprises one or more parking-space attributes.

6. The method of claim 5, wherein the one or more parking-space attributes corresponds to a distance of a parking space from a particular merchant, distance of a parking space from a security office, distance of a parking space from an exit location, type of parking space.

7. The method of claim 1, further comprising tracking, by the server, movement of the user of the first receiving device and the second receiving device.

8. The method of claim 1, wherein the server and the transmitter device communicate via a communications network.

9. The method of claim 1, wherein the server, the first receiving device, and the second receiving device communicate via a communications network.

10. The method of claim 1, wherein the first and the second receiving device is associated with an identifier that corresponds to one or more of SIM number, IMEI number.

11. A wireless transmission system comprising:

a database; and a server in communication with the database, the server configured to:

receive a unique identifier associated with a parking space from a first receiving device, wherein the unique identifier is transmitted by a transmitter device;

generate a first instruction to query a type of the unique identifier, wherein the of the unique identifier is associated with whether the parking space is occupied by the first receiving device;

transmit the first instruction to the database associated with one or more parking spaces;

in response to determining that a parking space is occupied by the first receiving device, generate a second instruction to modify a record within the database associated with the parking space as occupied;

generate a third instruction to query the first receiving device regarding a number of occupants within an automobile associated with the first receiving device;

upon transmitting the third instruction to the first receiving device, receive the number of occupants in the automobile associated with the first receiving device;

receive a query from a second receiving device about the availability of parking spaces;

generate a fourth instruction to receive one or more unoccupied parking spaces;

generate data for rendering on a graphical user interface comprising a census data, wherein the census data comprises at least one of the occupied parking spaces, unoccupied parking spaces, and number of occupants within the automobile; and transmit the data for rendering on the graphical user interface to the second receiving device.

12. The wireless transmission system of claim 11, wherein the unique identifier associated with the parking space is transmitted by the transmitter device to the first receiving device.

13. The wireless transmission system of claim 11, wherein the server is further configured to store the census data in the database.

14. The wireless transmission system of claim 11, wherein each receiving device comprises a wireless receiver, and wherein the wireless receiver is either coupled to each receiving device or the wireless receiver is an integrated part of each receiving device.

15. The wireless transmission system of claim 11, wherein the query from the second receiving device about the availability of the parking spaces comprises one or more parking-space attributes.

16. The wireless transmission system of claim 15, wherein the one or more parking-space attributes corresponds to a distance of a parking space from a particular merchant, distance of a parking space from a security office, distance of a parking space from an exit location, type of parking space.

17. The wireless transmission system of claim 11, further the server is further configured to track movement of the user of the first receiving device and the second receiving device.

18. The wireless transmission system of claim 11, wherein the server and the transmitter device communicate via a communications network.

19. The wireless transmission system of claim 11, wherein the server, the first receiving device, and the second receiving device communicate via a communications network.

20. The wireless transmission system of claim 11, wherein the first and the second receiving device is associated with an identifier that corresponds to one or more of SIM number, IMEI number.

* * * * *